United States Patent
Sayan et al.

(10) Patent No.: US 9,649,992 B2
(45) Date of Patent: May 16, 2017

(54) METHOD FOR ASSEMBLING A TRIM PART TO A SUPPORTING PART OF A VEHICLE

(71) Applicant: Ford Global Technologies, LLC, Dearborn, MI (US)

(72) Inventors: Ovgu Sayan, Istanbul (TR); Didem Colakel, Istanbul (TR); Aycin Polat, Istanbul (TR)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/152,002

(22) Filed: Jan. 10, 2014

(65) Prior Publication Data
US 2014/0217763 A1    Aug. 7, 2014

(30) Foreign Application Priority Data

Jan. 16, 2013 (EP) .................................... 13151471

(51) Int. Cl.
*B60R 13/02* (2006.01)

(52) U.S. Cl.
CPC ....... *B60R 13/0206* (2013.01); *Y10T 29/4978* (2015.01)

(58) Field of Classification Search
CPC .. B60R 13/02; B60R 13/0206; Y10T 29/4978
USPC ........................................................ 296/1.08
See application file for complete search history.

(56) References Cited

U.S. PATENT DOCUMENTS

| 5,117,549 A * | 6/1992 | Gaudreau ................ B60J 5/042 29/453 |
| 7,317,059 B2 * | 1/2008 | Inaba ....................... B01J 20/26 525/375 |
| 2002/0196297 A1 * | 12/2002 | Stevens .................... B41J 3/407 347/4 |
| 2003/0230044 A1 * | 12/2003 | Peterson ..................... 52/716.5 |

FOREIGN PATENT DOCUMENTS

| EP | 1209370 | 5/2002 |
| JP | S62 152945 | 7/1987 |

OTHER PUBLICATIONS

Post-it (R) http://www.post-it.com/wps/portal/3M/en_US/PostItNA/Home/Products/~/All-3M-Products/Brands/Post-it-Products/?Ntt=sign+here&rt=rs&x=0&y=0.*
http://www.homedepot.com/catalog/pdfImages/36/361685b4-c594-4663-ab40-b0352351a922.pdf.*

* cited by examiner

*Primary Examiner* — Glenn Dayoan
*Assistant Examiner* — Melissa A Black
(74) *Attorney, Agent, or Firm* — Damian Porcari; King & Schickli, PLLC

(57) ABSTRACT

The present invention relates to a method for assembling a trim part (10) to a sup-porting part (12) of a vehicle, wherein the trim part (10) has an outer surface (16) and an inner surface (18) and is fixable to the supporting part (12) by fixing means (14) provided on the inner surface (18), a fixing connection being established by engaging the fixing means (14) with counter means (20) provided on the supporting part (12), the method comprising following steps of aligning the trim part (10) and the supporting part (12) such that the fixing means (14) and the counter means (20) can be engaged to each other, engaging the fixing means (14) with the counter means (20) by applying force to the outer surface (Continued)

(16) of trim part (10), and fastening an indicator (30) on the outer surface (16) for indicating the position of the fixing means (14).

5 Claims, 1 Drawing Sheet

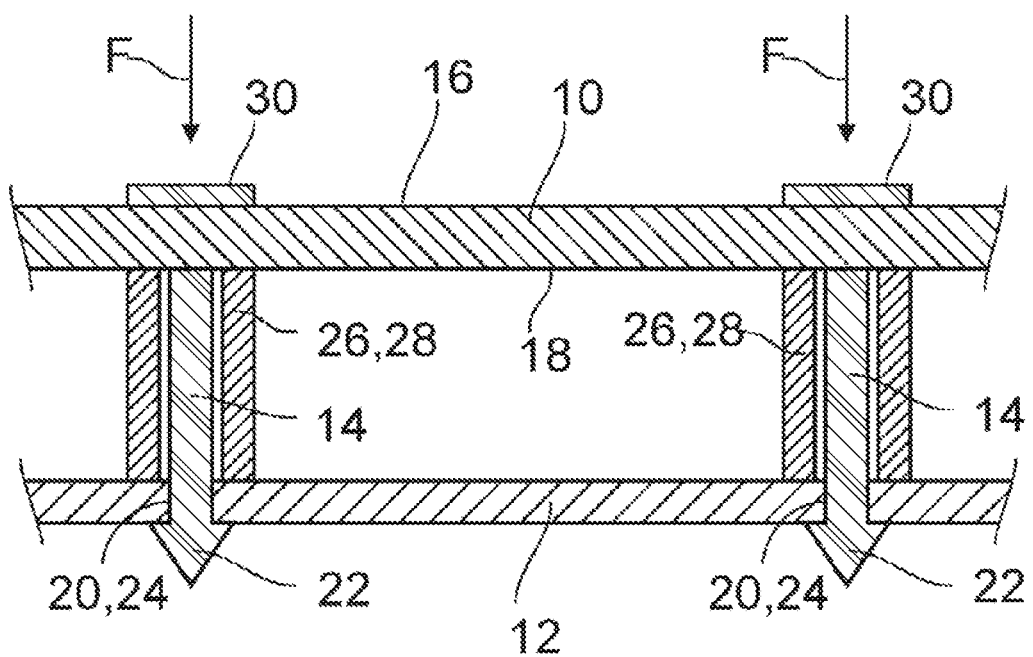

METHOD FOR ASSEMBLING A TRIM PART TO A SUPPORTING PART OF A VEHICLE

CROSS-REFERENCE TO RELATED APPLICATIONS

This application claims foreign priority benefits under 35 U.S.C. §119(a)-(d) to European Patent Application No. EP13151471.3, filed Jan. 16, 2013, the disclosure of which is hereby incorporated in its entirety by reference herein.

FIELD OF THE INVENTION

The present invention relates to a method for assembling a trim part to a supporting part of a vehicle, wherein the trim part has an outer surface and an inner surface opposing the outer surface and is fixable to the supporting part by fixing means provided on the inner surface, a fixing connection being established by engaging the fixing means with counter means provided on the supporting part.

BACKGROUND OF THE INVENTION

Due to technical and aesthetic reasons, trim parts are fixed to any kind of support parts of the vehicle by fixing means that are provided only on one surface of the trim part, for example the inner surface without leaving any marks on the other surface, i.e., the outer surface. The method known in the art comprises following steps for establishing a fixing connection between the trim part and the support part:

aligning the trim part and the supporting part such that the fixing means and the counter means can be engaged to each other, and engaging the fixing means with the counter means by applying force to the outer surface of trim part.

Since the fixing means do not leave any marks on the outer surface on which the force is applied, following problem arises. Upon assembly, the operator is facing the outer surface opposing the inner surface of the trim part. Since trim parts are often planar and relatively large, the fixing means are almost invisible to the operator. As a result, the operator does not know the exact position of the fixing means when applying force to the outer surface when engaging the fixing means to the counter means. Trim parts are often made of thin material. In many cases, cavities are formed between the trim parts and the support parts. When the operator is applying force to the outer surface of the trim part that is at distance from the fixing means, the trim part is prone to deformation which results in damage to the outer surface. This deformation of the trim part decreases the part quality and increases part rejections. The replacement of defect trim parts is time consuming and costly.

U.S. Pat. No. 5,117,549 discloses a method for fastening an interior trim part to a vehicle door by using adhesive beads and fasteners. However, the fasteners do not leave any marks on the outer surface and thus, the position of the fasteners is difficult to estimate when fastening the interior trim part to the vehicle door.

It is an object of the present invention to reduce the drawbacks of the previous methods. In particular, a method is presented that enables the estimation of the position of the fixing means when looking on the outer surface of the trim part upon assembly.

BRIEF SUMMARY OF THE INVENTION

The problems of prior methods is solved by fastening an indicator on the outer surface of the trim panel that indicates the position of the fixing means. The indicators show the operator where force may be applied without the risk of deforming the trim part. The position of the indicators on the outer surface is opposite of the fixing means. The indicators may be positioned during the manufacturing process of the trim part itself or afterwards, e.g., by applying a positioning device onto the trim part that indicates the positions where the indicators are placed. The indicators may be positioned by the supplier of the trim part or the operator. The operator is facing the outer surface of the trim part upon assembly and has a visual cue where force may be safely applied to engage the fixing means to the counter means. The amount of trim parts that are deformed during assembly is significantly reduced thereby economically enhancing the trim part quality.

The indicators are removed after the trim part is attached to the fixing means so as not to disturb later assembly steps nor mar the impression of the finished vehicle. The indicators may be immediately removed after the trim part is installed and re-used.

In a preferred embodiment of the invention, the step of fastening the indicators on the outer surface comprises the use of electrostatic interactions between the indicators and the outer surface. An alternative method to fasten the indicators on the outer surface may include the use of an adhesive agent.

BRIEF DESCRIPTION OF THE DRAWINGS

In the following the invention is explained in further detail by means of a preferred embodiment with reference to the accompanying drawings.

FIG. 1 is a sectional view through a trim part that is fastened to a support part, the trim part carrying an indicator.

DETAILED DESCRIPTION OF THE INVENTION

In FIG. 1, trim part 10 is fixed to supporting part 12 of a vehicle by fixing means 14. Trim part 10 comprises an outer surface 16 and an inner surface 18 wherein fixing means 14 is provided on inner surface 18 without leaving marks on outer surface 16. Trim part 10 is relatively thin and planar such that outer surface 16 is opposite inner surface 18. In the embodiment shown in FIG. 1, a fixing connection between the support part and the trim part 10 is established by engaging fixing means 14 of trim part 10 within opening 20 of supporting part 12. Fixing means 14 comprises an opened barb 22 made of a resilient material that may be introduced into opening 20 that is embodied as a through hole 24. The fixing connection is established as soon as barb 22 is fully pushed through through hole 24 and widens to open. In order to position trim part 10 relative to supporting part 12, spacer 26 is arranged between trim part 10 and supporting part 12. In the embodiment shown in FIG. 1, spacer 26 is a hollow cylinder 28 arranged around fixing means 14.

When fixing trim part 10 to supporting part 12, force must be applied to outer surface 16 in order to push barb 22 through through hole 24. In FIG. 1, the fixing force is indicated by the arrows F. However, since the trim parts 10 are usually thin, planar and non-transparent, the operator cannot estimate the position of fixing means 14. The operator is facing outer surface 16 which blocks the assembly. Deformation of trim part 10 is avoided by applying force near fixing means 14. In order to mark this area, indicators 30 are positioned opposite to fixing means 14 on outer surface 16 prior to assembly. Hence the operator knows where to apply force when assembling trim parts 10 even though the operator is facing the outer surface 16 opposite of inner surface 18.

After the fixing connection between trim part 10 the supporting part 12 is established, indicators 30 may be removed from outer surface 16 and may be reused for assembly of another trim part 10.

LIST OF REFERENCE NUMBERS

10 trim part
12 supporting part
14 fixing means
16 outer surface
18 inner surface
20 counter means
22 barb
24 through hole
26 spacer
28 hollow cylinder
30 indicator
F Force

What is claimed is:

1. A method for assembling a trim part (10) having an outer surface (16), an inner surface (18), a fixing means (14) to a supporting part (12) having a counter means (20), comprising: fastening an indicator (30) on the outer surface (16) opposite the fixing means (14) indicating the position of the fixing means (14); aligning the trim part (10) and the supporting part (12), wherein the aligning step includes arranging a spacer (26) between the trim part and the supporting part; and applying force near the indicator (30) to engage the fixing means (14) and the counter means (20).

2. The method according to claim 1, further comprising the step of removing the indicator (30) after assembly such that an impression is not present on the outer surface.

3. The method according to claim 1, wherein the spacer is a hollow cylinder.

4. The method according to claim 1, wherein the fixing means (14) is a coned widening made of a resilient material.

5. The method according to claim 1, wherein the counter means (20) is an opening.

\* \* \* \* \*